(12) United States Patent
Rowen et al.

(10) Patent No.: US 10,816,368 B2
(45) Date of Patent: Oct. 27, 2020

(54) METHOD AND SYSTEM FOR HIGH SENSITIVITY IN DISTRIBUTED FIBER SENSING APPLICATIONS

(71) Applicant: PRISMA PHOTONICS LTD., Tel Aviv (IL)

(72) Inventors: Eitan Rowen, Modiin (IL); Eran Inbar, Tel Aviv (IL); Omer Bar-Ilan, Haifa (IL)

(73) Assignee: PRISMA PHOTONICS LTD., Tel Aviv (IL)

( * ) Notice: Subject to any disclaimer, the term of this patent is extended or adjusted under 35 U.S.C. 154(b) by 70 days.

(21) Appl. No.: 16/256,248

(22) Filed: Jan. 24, 2019

(65) Prior Publication Data

US 2019/0226885 A1    Jul. 25, 2019

Related U.S. Application Data

(60) Provisional application No. 62/621,049, filed on Jan. 24, 2018.

(51) Int. Cl.
*G01D 5/353* (2006.01)
*G02B 6/42* (2006.01)

(52) U.S. Cl.
CPC ......... *G01D 5/353* (2013.01); *G01D 5/35358* (2013.01); *G02B 6/4208* (2013.01)

(58) Field of Classification Search
CPC ... G01D 5/353; G01D 5/35358; G02B 6/4208
See application file for complete search history.

(56) References Cited

U.S. PATENT DOCUMENTS

| 2016/0123718 A1* | 5/2016 | Roos ................. H04B 10/5165 |
| | | 356/498 |
| 2019/0226885 A1* | 7/2019 | Rowen .............. G01D 5/35358 |
| 2020/0182685 A1* | 6/2020 | He ..................... G01D 5/35358 |

OTHER PUBLICATIONS

A.H. Hartog et al., "The Use of Multi-frequency Acquisition to Significantly Improve the Quality of Fibre-optic Distributed Vibration Sensing", 78th EAGE conference and exhibition, 2016.

(Continued)

*Primary Examiner* — Tony Ko
(74) *Attorney, Agent, or Firm* — Knobbe, Martens, Olson & Bear, LLP

(57) ABSTRACT

Distributed fiber sensing system including a laser source, a circulator, a detector and an optical fiber, the circulator coupled with the laser source, the detector and the optical fiber, the laser source for generating at least two ultra-narrow linewidth interrogating pulses, the detector having a predetermined detection bandwidth for detecting back-scattered signals, the laser source including an ultra-narrow linewidth laser and a modulator, coupled with the ultra-narrow linewidth laser and the circulator, the modulator generating a plurality of pairs of interrogating pulses having a time delay, a frequency difference between two pulses of the same interrogating pair being less than the predetermined detection bandwidth and a frequency difference between two pulses not of the same interrogating pair being larger than the predetermined detection bandwidth, wherein the optical fiber can be characterized based on beat-notes between back-scattered signals originating from the pair of interrogating pulses detected by the detector.

17 Claims, 3 Drawing Sheets

(56) References Cited

OTHER PUBLICATIONS

D. Iida et al., "High frequency distributed acoustic sensing faster than repetition limit with frequency multiplexed phase OTDR", Optical Fiber Communications Conference and Exhibition, 2016.

Pan et al., "High sampling rate multi-pulse phase-sensitive OTDR employing frequency division multiplexing", 23rd International Conference on Optical Fiber Sensors, Jun. 2014.

Pan et al., "Phase-sensitive OTDR system based on digital coherent detection", Communications and Photonics and Conference Exhibition, 2011.

Wang et al., "Coherent Φ-OTDR based on I/Q demodulation and homodyne detection", Optics Express, 2016.

* cited by examiner

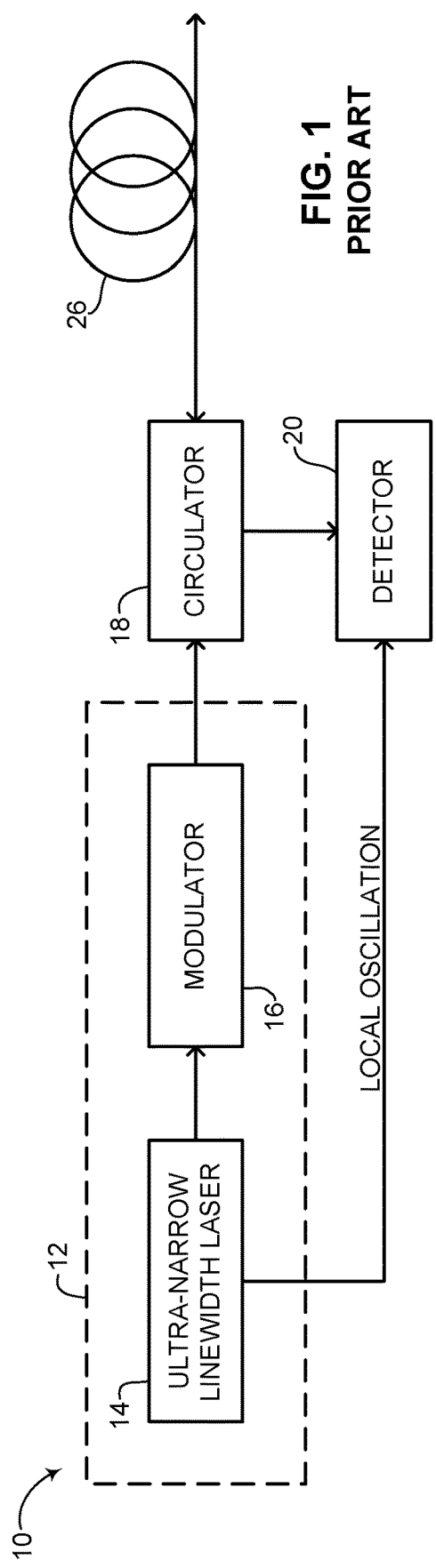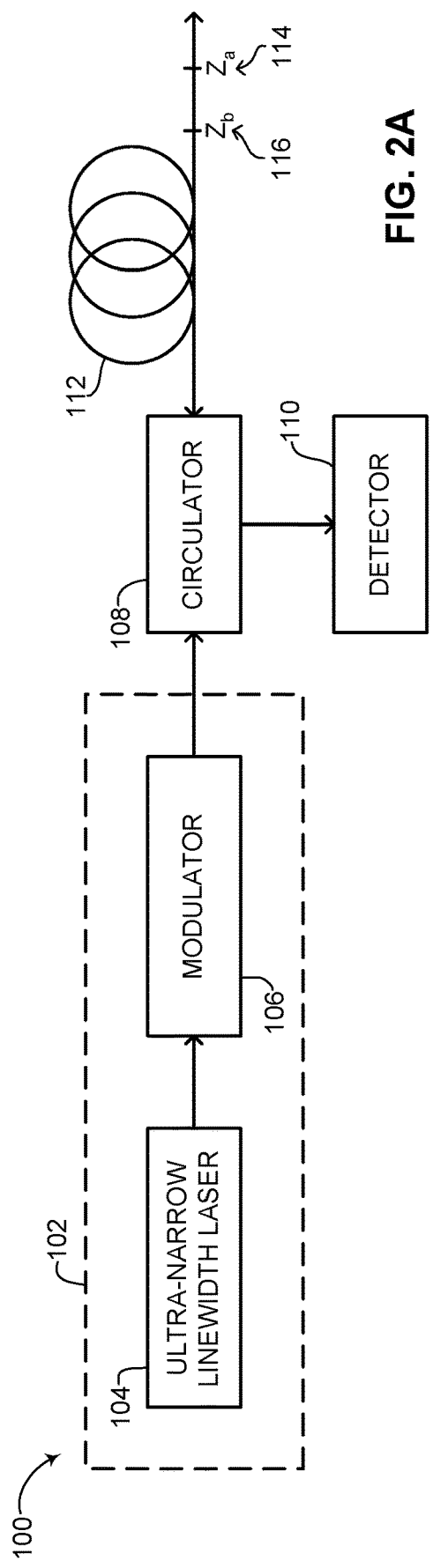

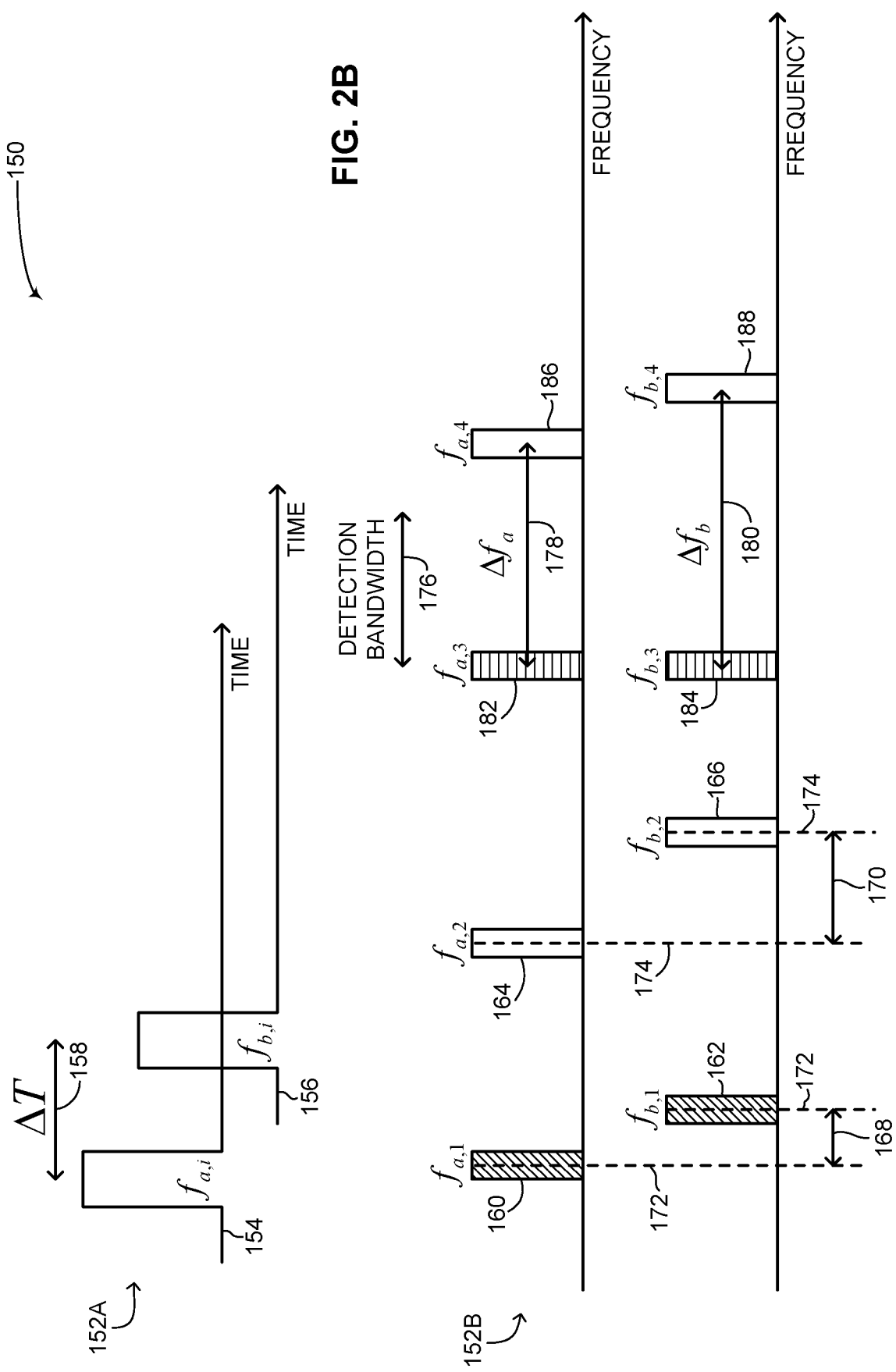

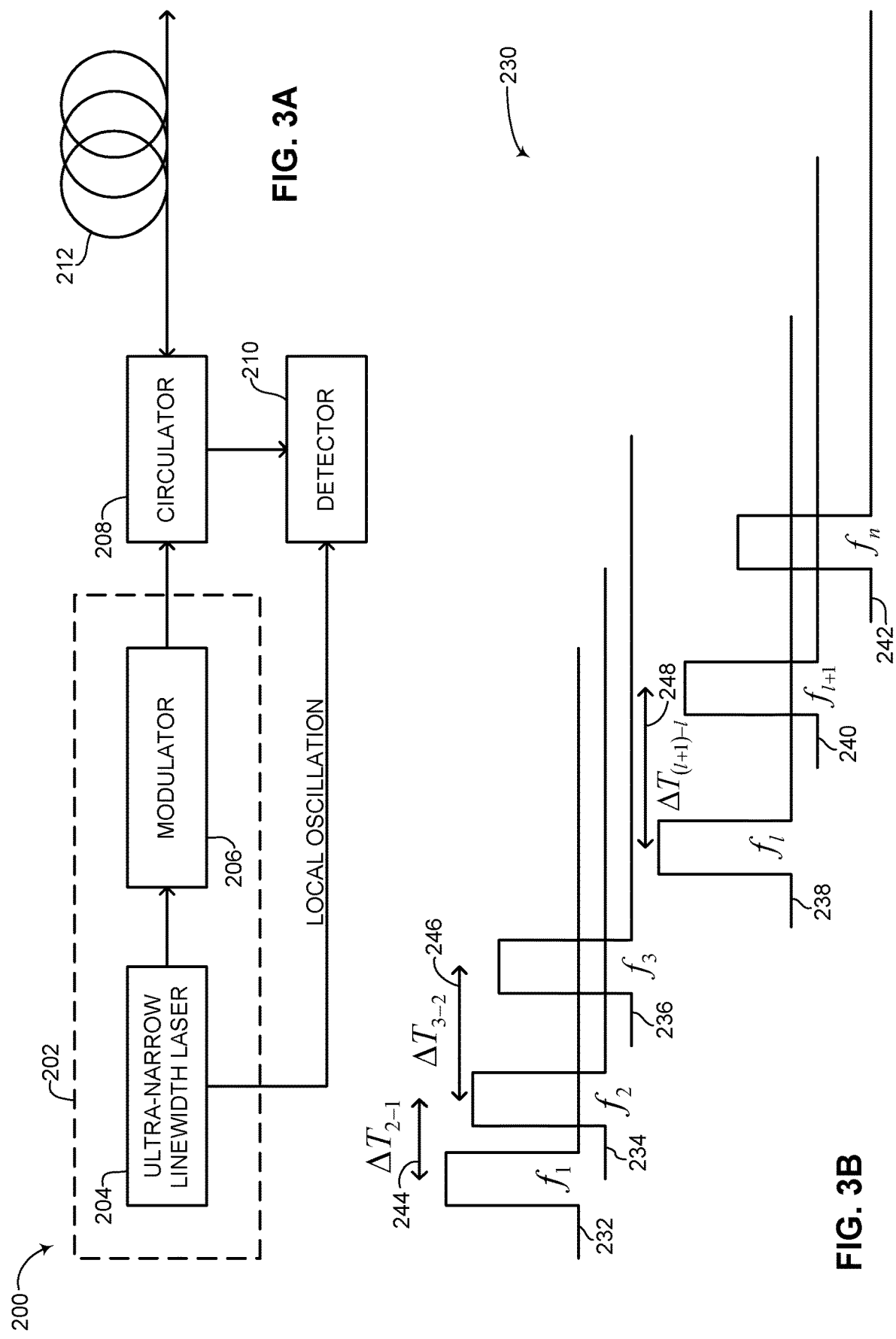

METHOD AND SYSTEM FOR HIGH SENSITIVITY IN DISTRIBUTED FIBER SENSING APPLICATIONS

CROSS-REFERENCE TO RELATED APPLICATIONS

This application claims priority to Provisional U.S. Pat. App. No. 62/621,049, filed on Jan. 24, 2018, which is hereby incorporated by reference in its entirety.

FIELD OF THE DISCLOSED TECHNIQUE

The disclosed technique relates to distributed fiber sensing configurations, in general, and to methods and systems for improved distributed fiber sensing setups without linewidth limitations associated with coherent detection, in particular.

BACKGROUND OF THE DISCLOSED TECHNIQUE

Distributed fiber sensing schemes and configurations are used to characterize an optical fiber and events occurring along the length of the optical fiber. Typically, events are determined based on a back-scattered signal in the optical fiber, which in many schemes such as phase sensitive optical time-domain reflectometry (herein abbreviated OTDR) is very weak. The power of the back-scattered signal can determine the signal-to-noise ratio (herein abbreviated SNR), and thus, the accuracy, measurement range and resolution of such configurations. It is a non-trivial task to increase the energy of the back-scattered signal to thus increase its SNR. One trivial possibility would be to increase the power of the forward propagating pulse along the optical fiber, also known as the interrogating pulse. However the interrogating pulse power is limited due to the appearance of non-linear optical phenomena at higher pulse powers. Another trivial possibility would be to increase the pulse duration of the interrogating pulse, however such a modification would reduce the resolution available in such a configuration. A third trivial possibility would be to transmit multiple interrogating pulses at a repetition rate faster than a single roundtrip time in the optical fiber. However such a setup will lead to ambiguity in detecting the locations along the optical fiber where the back-scattered signals originated from.

Configurations for overcoming the last limitation are known in the art. For example U.S. Pat. No. 7,859,654, to Hartog, entitled "Frequency-scanned optical time domain reflectometry" is directed to a method for transmitting multiple interrogating pulses at different laser frequencies to reduce ambiguities in the back-scattered signals. In addition, using multiple wavelengths to probe the characteristics of an optical fiber can overcome the problem of Rayleigh fading, as described in the article "The Use of Multi-frequency Acquisition to Significantly Improve the Quality of Fibre-optic Distributed Vibration Sensing" to Hartog et al., published during the 78$^{th}$ EAGE conference and exhibition in 2016. Using multiple wavelengths to probe an optical fiber can also enable the measurement of higher acoustic frequencies, as discussed in "High-frequency distributed acoustic sensing faster than repetition limit with frequency-multiplexed phase-OTDR" to D. Iida et al., published in Optical Fiber Communications Conference and Exhibition, 2016 and in "High sampling rate multi-pulse phase-sensitive OTDR employing frequency division multiplexing" to Pan et al., published in the 23$^{rd}$ International Conference on Optical Fiber Sensors, June 2014.

Reference is now made to FIG. 1, which is a schematic illustration of a distributed fiber sensing laser for distinguishing between back-scattered signals at different frequencies employing coherent detection, generally referenced 10, as is known in the art. Distributed fiber sensing laser 10 includes a laser source 12, a circulator 18, a detector 20 and an optical fiber 26. Laser source 12 includes an ultra-narrow linewidth (herein abbreviated UNLW) laser 14 and a modulator 16. UNLW laser 14 is coupled with modulator 16 and also with detector 20. Circulator 18 is coupled with modulator 16, detector 20 and optical fiber 26. UNLW laser 14 generates interrogating pulses which are modulated by modulator 16 and provided via circulator 18 to optical fiber 26. Back-scattered signals from optical fiber 26 enter circulator 18 and are provided to detector 20. Back-scattered signals having different frequencies can be distinguished by detector 20 using a technique of coherent detection as shown in FIG. 1. In this scheme, a back-scattered signal entering detector 20 is mixed with a signal from a local oscillator. In FIG. 1, UNLW laser 14 is used to both transmit interrogating pulses and also to provide a local oscillator signal to detector 20. The local oscillator signal is mixed with the back-scattered signals to generate beat-tones. Back-scattered components originating from the interrogating pulses of different frequencies can then be distinguished by detector 20 according to the different beat-tones created by the mixing of the back-scattered signals with the local oscillator signal. As mentioned above, this technique is referred to as coherent detection and has a number of advantages. First, it enables measurement of the amplitude and the phase of the back-scattered pulse; second, beating with the local oscillator signal enables the detection of very weak back-scattered signals; and third, there is a linearity of the measured quantities rather than a quadratic dependence as found in ordinary power detectors.

Coherent detection however also has a significant drawback, namely laser frequency noise leads to phase noise in the measurement of the back-scattered signal at the detector. Phase noise increases with the length of the sensing fiber (i.e., the optical fiber), imposing a limit on the linewidth and the amounts of frequency noise that are tolerable by the laser used. For example, if the sensing fiber roundtrip time is denoted by $\tau$, then the linewidth must be significantly smaller than $1/2\pi\tau$. This is described in "Phase-sensitive OTDR system based on digital coherent detection" to Pan et al. published in Communications and Photonics Conference and Exhibition, 2011.

SUMMARY OF THE DISCLOSED TECHNIQUE

It is an object of the disclosed technique to provide a distributed fiber sensing configuration and method for enabling the detection and measurement of back-scattered signals having multiple wavelengths without requiring the ultra-narrow linewidth limitations associated with coherent detection.

In accordance with the disclosed technique there is thus provided a distributed fiber sensing system including a laser source, a circulator, a detector and an optical fiber. The circulator is coupled with the laser source, the detector and the optical fiber. The laser source is for generating at least two ultra-narrow linewidth interrogating pulses. The detector has a predetermined detection bandwidth and is for detecting back-scattered signals. The laser source includes an ultra-narrow linewidth laser and a modulator which is coupled with the ultra-narrow linewidth laser and the circulator. The modulator generates a plurality of pairs of interrogating pulses having a time delay, where a frequency difference between two pulses of the same interrogating pair is less than the predetermined detection bandwidth and a frequency difference between two pulses not of the same interrogating pair is larger than the predetermined detection bandwidth. The optical fiber can be characterized based on beat-notes between back-scattered signals originating from the pair of interrogating pulses detected by the detector.

In accordance with another aspect of the disclosed technique there is thus provided a distributed fiber sensing system including a laser source, a circulator, a detector and an optical fiber. The circulator is coupled with the laser source and the optical fiber. The detector is coupled with the circulator and the laser source. The laser source is for generating at least two ultra-narrow linewidth interrogating pulses and at least one local oscillation signal. The detector is for detecting back-scattered signals. The laser source includes an ultra-narrow linewidth laser and a modulator. The ultra-narrow linewidth laser is coupled with the detector and the modulator is coupled with the ultra-narrow linewidth laser and the circulator. The modulator generates consecutive interrogating pulses having a time delay and the ultra-narrow linewidth laser provides the local oscillation signal to the detector to beat back-scattered signals originating from the consecutive interrogating pulses. The optical fiber can be characterized based on a phase difference between beat-notes between the back-scattered signals originating from the consecutive interrogating pulses detected by the detector.

BRIEF DESCRIPTION OF THE DRAWINGS

The disclosed technique will be understood and appreciated more fully from the following detailed description taken in conjunction with the drawings in which:

FIG. 1 is a schematic illustration of a distributed fiber sensing laser for distinguishing between back-scattered signals at different frequencies employing coherent detection, as is known in the art;

FIG. 2A is a schematic illustration of a distributed fiber sensing laser for distinguishing between back-scattered signals at different frequencies employing direct detection, constructed and operative in accordance with an embodiment of the disclosed technique;

FIG. 2B is a schematic illustration of various differences between two interrogating pulses in the time domain and the frequency domain as used with the system of FIG. 2A, constructed and operative in accordance with another embodiment of the disclosed technique;

FIG. 3A is a schematic illustration of a distributed fiber sensing laser for distinguishing between back-scattered signals at different frequencies employing coherent detection, constructed and operative in accordance with a further embodiment of the disclosed technique; and FIG. 3B is a schematic illustration of the timing difference between various interrogating pulses used with the system of FIG. 3A, constructed and operative in accordance with another embodiment of the disclosed technique.

DETAILED DESCRIPTION OF THE EMBODIMENTS

The disclosed technique overcomes the disadvantages of the prior art by providing a novel distributed fiber sensing configuration and method for enabling the detection and measurement of back-scattered signals having multiple wavelengths without requiring the ultra-narrow linewidth limitations associated with coherent detection. In a first embodiment of the disclosed technique, a distributed fiber sensing configuration is used without any local oscillation signal mixing. Different carrier pairs of interrogating pulses are transmitted with a time separation of $\Delta T$ and are detected by direct detection on a detector without any intermediary mixing of signals. The interference between the two carriers in the pair leads to beating at the frequency difference between the carrier frequencies. The amplitude and phase of the different beat-notes can be measured without ambiguity if the beating frequency of each pair is unique. According to the disclosed technique, in order to avoid beating between carriers that are not pairs, the frequency separation between all carriers that are not pairs is selected such that it is larger than the detection bandwidth of the detector. The phase of the beat-note carries information about the acoustic signal to be detected. Since the interference generated is between back-scattered signals originating from carriers emitted from a laser source having a time difference of $\Delta T$, the linewidth of the laser is dependent on the time difference and not the sensing fiber roundtrip time $\tau$. Thus according to the disclosed technique, the linewidth of the laser source should be smaller than $\frac{1}{2\pi\Delta T}$ rather than $\frac{1}{2\pi\tau}$ (as described in the prior art).

In a second embodiment of the disclosed technique, a distributed fiber sensing configuration is used with a mixed in local oscillation signal, however the carriers of the interrogating signals need not be transmitted in pairs. As in the previous embodiment, a time separation of $\Delta T$ is used between the transmissions of different frequency pulses. In this embodiment, back-scattered pulses are detected coherently by beating with a local oscillator signal. However unlike the prior art, the signal that is analyzed in an attempt to learn about acoustic changes in the back-scattered signal is not the phase of the beat-note of the back-scattered signal at a frequency $f_i$ but rather the phase difference between beat-notes originating from consecutive interrogating pulses. The phase noise of this quantity is much smaller than that of each of the beat-notes themselves due to common-mode rejection of most of the phase noise.

Reference is now made to FIG. 2A, which a schematic illustration of a distributed fiber sensing laser for distinguishing between back-scattered signals at different frequencies employing direct detection, generally referenced 100, constructed and operative in accordance with an embodiment of the disclosed technique. Distributed fiber sensing laser 100 includes a laser source 102, a circulator 108, a detector 110 and an optical fiber 112. Distributed fiber sensing laser 100 can also be referred to as a distributed fiber sensing system. Laser source 102 includes an ultra-narrow linewidth laser 104 and a modulator 106. UNLW laser 104 is coupled with modulator 106. Circulator 108 is coupled with modulator 106, detector 110 and optical fiber 112. UNLW laser 104 generates a pair of interrogating laser pulses which are provided to modulator 106. The frequencies of the laser pulse pair can be modulated by modulator 106 to create interrogating pulses with different carrier frequencies in a variety of ways, including electro-optic modulation and acousto-optic modulation. The modulated laser pulse pair is provided to optical fiber 112 via circulator 108. Any back-scattered signals are provided via circulator 108 to detector 110. As described below, distributed fiber sensing laser 100 determines characteristics of optical fiber 112 via back-scattered signals using direct detection and without the need for a mixing signal as used in coherent detection.

Reference is now made to FIG. 2B, which is a schematic illustration of various differences between two interrogating pulses in the time domain and the frequency domain as used with the system of FIG. 2A, generally referenced 150, constructed and operative in accordance with another embodiment of the disclosed technique. FIG. 2B shows different configurations for generating pairs of interrogating pulses, a timing configuration 152A (shown on a time scale) and a frequency configuration 152B (shown on a frequency scale). In timing configuration 152A, two laser pulses 154 and 156 are shown, with laser pulse 154 having a frequency $f_{a,i}$ and laser pulse 156 having a frequency $f_{b,i}$, representing an interrogating pulse pair. In general, n sets of interrogating pulse pairs can be transmitted with the subscript 'a' representing the first interrogating pulse in a pair and the subscript 'b' representing the second interrogating pulse in the pair. The subscript T represents the interrogation pulse pair number. Laser source 102 (FIG. 2A) transmits two laser pulses 154 and 156 having a time delay $\Delta T$, shown by an arrow 158. According to the disclosed technique, time delay 158 does not need to be the same for each interrogating pulse pair, therefore $\Delta T_i$ does not need to equal $\Delta T_{i+1}$. In addition, the pulse durations of laser pulses 154 and 156 also do not need to be the same. In principle, as shown in timing configuration 152A, all first interrogating pulses in a pair can be emitted together and then all second interrogating pulses in a pair can be emitted together after a time delay of $\Delta T$. Alternatively, each interrogating pair, with its particular time delay $\Delta T_i$ can be emitted at a different time. The possibility also exists of emitting some interrogating pairs with the same time delay and other interrogating pairs with a different time delay.

In frequency configuration 152B, the frequency of interrogating pulse pairs (from the first pulse in a pair, subscript 'a' and from the second pulse in a pair, subscript 'b') is shown when they are generated as frequency combs. This is useful in the case when interrogating pulse pairs are transmitted at the same time. As shown, a first pair of interrogating pulses 160 and 162 are transmitted having a frequency difference shown by an arrow 168, bounded by dotted lines 172 whereas a second pair of interrogating pulses 164 and 166 are transmitted having a frequency difference shown by an arrow 170, bounded by dotted lines 174. As can be seen in frequency configuration 152B, each pair of interrogating pulses can be transmitted having a different frequency difference or having the same frequency difference and can be transmitted at the same time, as shown by interrogating pulses 182 and 184 or at different times, as shown by interrogating pulses 186 and 188. In order to be able to detect only the interference between wanted pairs of interrogating pulses, such as between interrogating pulses 160 and 162 and between interrogating pulses 164 and 166, and not between other pairs, such as between interrogating pulses 160 and 164, interrogating pulses 162 and 166, or between interrogating pulses 182 and 186 or interrogating pulses 184 and 188, the frequency differences of all other interrogating pulse pairs must be larger than the detection bandwidth of detector 110 (FIG. 2B). As shown, a frequency difference between interrogating pulses 182 and 186 is shown by an arrow 178 as $\Delta f_a$ whereas a frequency difference between interrogating pulses 184 and 188 is shown by an arrow 180 as $\Delta f_b$. Both frequency differences are larger than the detection bandwidth of detector 110 which is schematically shown by an arrow 176. For interrogating pulses to be detected based on their interference, their frequency differences must be less than the detection bandwidth, such as $f_{b,1}-f_{a,1}$ shown by arrow 168 or $f_{b,2}-f_{a,2}$ shown by arrow 170 which are both smaller than detection bandwidth 176.

One method of generating the frequency combs shown in second timing configuration 152B is by modulating the phase of an emitted pulse from UNLW laser 104 (FIG. 2A) with modulator 106 (FIG. 2A) embodied as an electro-optic modulator driven at a frequency of $\Delta f_a$ during the first emitted pulse of a pulse pair and at a frequency of $\Delta f_b$ during the second emitted pulse of the pulse pair emitted after a time $\Delta T$. Another method of generating the interrogating pulse pairs is by generating the pulses of an interrogating pulse pair at different times by creating sidebands at the required frequency at each moment.

With reference back to FIG. 2A, the back-scattered light from optical fiber 112 is detected by detector 110 which can be embodied as a photo-detector such an avalanche photo-diode (herein abbreviated APD) or a photodiode. At any given moment, for a given pulse pair (transmitted for example using the timing configuration of FIG. 2B), the detected signal in detector 110 includes a beat-note between the two carrier signals at frequencies of $f_{a,i}$ and $f_{b,i}$. As shown in FIG. 2B, the detected beat-note originates from back-scattering events of frequency $f_{a,i}$ from $Z_a$ and of frequency $f_{b,i}$ from $Z_b$ respectively, along optical fiber 112, shown by arrows 114 and 116. As mentioned above, in order that the interference detected is only between the desired pairs, all other frequency differences between transmitted interrogating pulses must be larger than the detection bandwidth of detector 110. As a numeric example, if detector 110 has a detection bandwidth of 200 MHz and $\Delta f_a$=500 MHz and $\Delta f_b$=520 MHz, then 10 pairs of carrier signals can be generated with frequency differences that are multiples of 20 MHz. Generating these carrier signals thus requires a modulation bandwidth of ~5 GHz. Thus according to the disclosed technique, there is no limitation on the resolution of distributed fiber sensing laser 100 based on the length of optical fiber 112. The resolution according to the disclosed technique is a function of detection bandwidth of detector 110 as well as the limits of the possible time delay between interrogating pulse pairs. As an example, a time delay time of 100 nanoseconds corresponds to a spatial resolution of ~10 meters, posing a requirement of a coherence length of approximately 100 meters. In coherent detection as per the prior art, the coherence length could be as large as 100 kilometers or more, depending on sensing fiber length. The disclosed technique thus describes a configuration and method for detecting multiple wavelengths of interrogating pulses without a coherence length that scales with the optical fiber length.

Reference is now made to FIG. 3A is a schematic illustration of a distributed fiber sensing laser for distinguishing between back-scattered signals at different frequencies employing coherent detection, generally referenced 200, constructed and operative in accordance with a further embodiment of the disclosed technique. Distributed fiber sensing laser 200 includes a laser source 202, a circulator 208, a detector 210 and an optical fiber 212. Distributed fiber sensing laser 200 can also be referred to as a distributed fiber sensing system. Laser source 202 includes an ultra-narrow linewidth laser 204 and a modulator 206. UNLW laser 204 is coupled with modulator 206 and also with detector 210. Circulator 208 is coupled with modulator 206, detector 210 and optical fiber 212. UNLW laser 204 generates interrogating pulses which are modulated by modulator 206 and provided via circulator 208 to optical fiber 212. Back-scattered signals from optical fiber 212 enter circulator 208 and are provided to detector 210. Back-scattered signals having different frequencies can be distinguished by detector 210 according to the disclosed technique based on a determination of the phase difference between beat-notes from consecutive interrogating pulses, as described below in FIG. 3B. In this configuration, a back-scattered signal entering detector 210 is mixed with a signal from a local oscillator. In FIG. 3A, UNLW laser 204 is used to both transmit interrogating pulses and also to provide a local oscillator signal to detector 210. The local oscillator signal is mixed with the back-scattered signals to generate beat-tones. According to the disclosed technique, the back-scattered signal is detected by interfering it with the local oscillation signal before detection by detector 210. The DC term in detector 210 can be eliminated by balanced detection or by using a low-pass filter (not shown). The detection executed by detector 210 can be I/Q (baseband in-phase and quadrature-phase) detection as described in "Coherent ϕ-OTDR based on I/Q demodulation and homodyne detection" to Wang et al., published in Optics Express, 2016, or heterodyne detection as described in "Phase-sensitive OTDR system based on digital coherent detection" to Pan et al. In prior art distributed fiber sensing lasers, the required coherence length of the laser is longer than the fiber length L. In terms of linewidth, assuming white frequency noise only, the laser linewidth needs to be smaller than $$\frac{1}{2\pi\tau}$$

where $\tau=2$ L/v and is the roundtrip time and v is the velocity of light in the optical fiber.

Reference is now made to FIG. 3B, which is a schematic illustration of the timing difference between various interrogating pulses used with the system of FIG. 3A, generally referenced 230, constructed and operative in accordance with another embodiment of the disclosed technique. FIG. 3B shows a plurality of interrogation pulses 232, 234, 236, 238, 240 and 242, each having a different carrier frequency, as shown as frequencies $f_1, f_2, f_3 \ldots f_l, f_{l+1} \ldots f_n$. Shown as well are the time differences between consecutive interrogation pulses, such as between interrogation pulses 232 and 234, shown as a time delay $\Delta T_{2-1}$ via an arrow 244, interrogation pulses 234 and 236, shown as a time delay $\Delta T_{3-2}$ via an arrow 246 and interrogation pulses 238 and 240, shown as a time delay $\Delta T_{(l+1)-l}$ via an arrow 248. The time delay between consecutive pulses does not need to be the same for all consecutive pulse pairs. In the timing scheme of FIG. 3B, the different signal carriers are transmitted at different times, with a time delay between consecutive interrogation pulses that determines the resolution of distributed fiber sensing laser 200 (FIG. 3A). Back-scattered signals are coherently detected by detector 210 (FIG. 3A) using a local oscillation signal but are analyzed pair-wise. According to the disclosed technique, while coherent detection leads to phase noise in the measured signals as in the prior art, this noise is cancelled almost completely in the pair-wise analysis of the disclosed technique.

With reference back to FIG. 3A, the detected signal in detector 210 is acquired by beating the back-scattered signal with a local oscillation signal on, for example, a balanced detector. The different carrier signals are separated after detection, obtaining $E_l(t)=|E_l(t)|e^{i\Phi_l(t)}$ for each of the 1 carriers. The phase has a phase error with a variance proportional to the roundtrip time $\tau$ (approximately $2\pi\tau\times\Delta f$ where $\Delta f$ is the laser linewidth of UNLW laser 204). Instead of analyzing each carrier separately or all carriers together, the signal that is analyzed according to the disclosed technique is $E_l E_{l+1}^*$. The variance of the relative phase noise of this quantity is proportional to $\Delta T$ rather than $\tau$. In effect, most of the phase error acquired is cancelled out, since it is common to both interrogation pulses l and l+1. The phase noise that is left is due to the phase change in the laser between the emission of these two consecutive pulses rather than the roundtrip time. The laser frequency stability is thus the same as in the embodiment described above in FIG. 2A. In the embodiment of FIG. 3A, a similar signal is created digitally for each of the adjacent carriers. This configuration benefits from all the advantages of coherent detection such as: dynamic range, local oscillation amplification and linearity, yet only requiring a coherence length of the sensing fiber to be on the order ~100 meters rather than ~100 kilometers.

In this embodiment, the coherent detection of detector 210 could be homodyne detection, heterodyne detection or I/Q detection, as described above. The polarization can be scrambled to average over the different polarizations or the different polarizations can be measured on different detectors. It is noted that the configurations shown in FIGS. 2A and 3A can include additional amplifiers (not shown) such as Erbium doped fiber amplifiers or distributed Raman amplifiers, to ensure high SNR as well as variable optical attenuators (not shown) to use the full dynamic range of the detector at each instant. According to the disclosed technique, the configurations can include either at least one additional amplifier, at least one variable optical attenuator or both.

It will be appreciated by persons skilled in the art that the disclosed technique is not limited to what has been particularly shown and described hereinabove. Rather the scope of the disclosed technique is defined only by the claims, which follow.

The invention claimed is:

1. A distributed fiber sensing system, comprising:
   a laser source, for generating at least two ultra-narrow linewidth interrogating pulses;
   a circulator, coupled with said laser source;
   a detector, coupled with said circulator, said detector comprising a predetermined detection bandwidth, for detecting back-scattered signals; and
   an optical fiber, coupled with said circulator,
   said laser source comprising:
     an ultra-narrow linewidth laser; and
     a modulator, coupled with said ultra-narrow linewidth laser and said circulator,
   wherein said modulator generates a plurality of pairs of interrogating pulses having a time delay;
   wherein a frequency difference between two pulses of the same interrogating pair is less than said predetermined detection bandwidth;
   wherein a frequency difference between two pulses not of the same interrogating pair is larger than said predetermined detection bandwidth; and
   wherein said optical fiber can be characterized based on beat-notes between back-scattered signals originating from said pair of interrogating pulses detected by said detector.

2. The distributed fiber sensing system according to claim 1, wherein said plurality of pairs of interrogating pulses have different carrier frequencies.

3. The distributed fiber sensing system according to claim 2, wherein said different carrier frequencies are generated by a technique selected from the list consisting of:
- electro-optic modulation; and
- acousto-optic modulation.

4. The distributed fiber sensing system according to claim 1, wherein said modulator generates said plurality of pairs of interrogating pulses by a technique selected from the list consisting of:
- modulating a phase of a first one of said at least two ultra-narrow linewidth interrogating pulses at a first frequency and a phase of a second one of said at least two ultra-narrow linewidth interrogating pulses at a second frequency; and
- generating said plurality of pairs of interrogating pulses at different times by creating sidebands at a required frequency at each moment.

5. The distributed fiber sensing system according to claim 1, wherein said time delay is selected from the list consisting of:
- being different for each one of said plurality of pairs of interrogating pulses;
- being the same for each one of said plurality of pairs of interrogating pulses; and
- being different for some of said plurality of pairs of interrogating pulses and being the same for others of said plurality of pairs of interrogating pulses.

6. The distributed fiber sensing system of claim 1, wherein each one of said plurality of pairs of interrogating pulses is transmitted having a parameter selected from the list consisting of:
- being transmitted at the same time;
- being transmitted at different times;
- being transmitted having the same frequency difference;
- being transmitted having a different frequency difference;
- being transmitted having the same pulse duration; and
- being transmitted having a different pulse duration.

7. The distributed fiber sensing system of claim 1, wherein said detector is selected from the list consisting of:
- a photo-detector;
- an avalanche photodiode; and
- a photodiode.

8. The distributed fiber sensing system of claim 1, further comprising at least one of:
- at least one amplifier, to ensure high signal-to-noise ratio; or
- at least one variable optical attenuator, to use a full dynamic range of said detector at each instant.

9. The distributed fiber sensing system of claim 8, wherein said at least one amplifier is selected from the list consisting of:
- an Erbium doped fiber amplifier; and
- a distributed Raman amplifier.

10. A distributed fiber sensing system, comprising:
- a laser source, for generating at least two ultra-narrow linewidth interrogating pulses and at least one local oscillation signal;
- a circulator, coupled with said laser source;
- a detector, coupled with said circulator and said laser source, said detector for detecting back-scattered signals; and
- an optical fiber, coupled with said circulator,
- said laser source comprising:
  - an ultra-narrow linewidth laser, coupled with said detector; and
  - a modulator, coupled with said ultra-narrow linewidth laser and said circulator,
- wherein said modulator generates consecutive interrogating pulses having a time delay;
- wherein said ultra-narrow linewidth laser provides said at least one local oscillation signal to said detector to beat back-scattered signals originating from said consecutive interrogating pulses; and
- wherein said optical fiber can be characterized based on a phase difference between beat-notes between said back-scattered signals originating from said consecutive interrogating pulses detected by said detector.

11. The distributed fiber sensing system according to claim 10, wherein a DC term in said detector can be eliminated using a technique selected from the list consisting of:
- balanced detection; and
- using a low-pass filter.

12. The distributed fiber sensing system according to claim 10, wherein said detector detects said back-scattered signals by a technique selected from the list consisting of:
- baseband in-phase and quadrature-phase detection;
- heterodyne detection; and
- homodyne detection.

13. The distributed fiber sensing system according to claim 10, wherein said time delay of each one of said consecutive interrogating pulses is not the same for all of said consecutive interrogating pulses.

14. The distributed fiber sensing system according to claim 10, wherein said consecutive interrogating pulses are transmitted at different times and wherein said time delay of said consecutive interrogating pulses determines a resolution of said distributed fiber sensing system.

15. The distributed fiber sensing system according to claim 10, wherein said back-scattered signals are detected coherently by said detector using said at least one local oscillation signal and analyzed pair-wise.

16. The distributed fiber sensing system of claim 10, further comprising at least one of:
- at least one amplifier, to ensure high signal-to-noise ratio; or
- at least one variable optical attenuator, to use a full dynamic range of said detector at each instant.

17. The distributed fiber sensing system of claim 16, wherein said at least one amplifier is selected from the list consisting of:
- an Erbium doped fiber amplifier; and
- a distributed Raman amplifier.

* * * * *